United States Patent [19]

Russell et al.

[11] 4,262,055

[45] Apr. 14, 1981

[54] FIRE PROTECTION MATERIALS AND METHODS OF MAKING THEM

[75] Inventors: Robert O. Russell, Fairview Park; Robert W. Limes, Seven Hills; Robert C. Best, Chagrin Falls, all of Ohio

[73] Assignee: Republic Steel Corporation, Cleveland, Ohio

[21] Appl. No.: 1,474

[22] Filed: Jan. 8, 1979

[51] Int. Cl.$^3$ .............. C04B 35/04; B05D 3/02; B32B 9/04
[52] U.S. Cl. ...................... 428/341; 106/58; 106/85; 106/121; 427/372.2; 428/703
[58] Field of Search ............... 106/58, 85, 121; 427/445, 372 R, 372.2; 428/341, 539

[56] References Cited

U.S. PATENT DOCUMENTS

| | | | |
|---|---|---|---|
| 3,285,758 | 11/1966 | Limes et al. | 106/58 |
| 3,413,385 | 11/1968 | Komac et al. | 106/58 X |
| 3,778,304 | 12/1973 | Thompson | 428/921 X |
| 3,879,209 | 4/1975 | Limes et al. | 106/85 X |
| 3,963,849 | 6/1976 | Thompson | 428/921 X |
| 4,059,455 | 11/1977 | Limes et al. | 106/58 |
| 4,152,167 | 5/1979 | Horvitz et al. | 106/58 |
| 4,166,743 | 9/1979 | Wortmann et al. | 428/921 X |
| 4,168,175 | 9/1979 | Shutt | 428/921 X |

*Primary Examiner*—Michael R. Lusignan
*Attorney, Agent, or Firm*—Cooper, Dunham, Clark, Griffin & Moran

[57] ABSTRACT

A fire protection material, suitable for use as a coating for structural members, produced by mixing a lightweight refractory aggregate including magnesia with ammonium phosphates in aqueous solution wherein the composition of the phosphates is at least about 20% by weight polyphosphates, balance orthophosphate, and allowing the mixture to set as a fire protection coating or body having a bulk density of not more than about 50 lb./ft.$^3$.

12 Claims, No Drawings

FIRE PROTECTION MATERIALS AND METHODS OF MAKING THEM

BACKGROUND OF THE INVENTION

This invention relates to fire protection materials, such as coatings for steel or other structural members, and to methods of making these materials.

Steel beams and other structural members in buildings are commonly coated with a fire protective material to enhance their fire resistance. Currently commercially available materials used to provide these insulating coatings are generally cementitious, and are typically applied (e.g. to a steel beam surface) in a layer about one inch thick. A conventional coating of this type on a steel surface will ordinarily be effective to keep the temperature of the steel substrate below 1000° F. for at least about one hour of continuous exposure of the coating surface to a temperature of 2000° F. It will be understood that the coating of steel structural members represents an especially important field of use of fire protection materials as contemplated herein, but such materials may also be employed to coat surfaces of wood or other substances and in some instances even to constitute fire protection layers or bodies other than coatings.

While present-day materials are capable of affording substantial fire protection, their use has been attended with various problems. For instance, when applied they require a relatively long time to set, and cannot be applied or used satisfactorily at low temperatures, e.g. in cold-weather conditions in unheated buildings. The attainment of a satisfactory coating bond to a substrate (e.g. steel) surface has frequently been troublesome. Moreover, coatings of these known compositions require special protection against accidental impacts and other hazards of normal construction as they are quite fragile and their integrity is easily destroyed. In addition, they tend not to endure exposure to fire well enough to be able to be patched and used thereafter for continued fire protection service.

It has heretofore been known that fast-setting structures having advantageous properties for diverse uses can be produced by mixing, with a magnesia-containing aggregate, ammonium phosphates in aqueous solution, provided that the composition of the phosphates includes a substantial proportion of polyphosphates. In these structures there is chemical bonding involving the magnesia and the phosphates. U.S. Pat. No. 3,879,209 and No. 4,059,455 describe methods of producing concrete structures by establishing such a mixture and allowing it to set for an extended period at ambient atmospheric temperature. The structures thus produced progressively develop hydraulic strength, form strong bonds with existing concrete or other surfaces, and have low porosity so as to be capable of outdoor load-bearing use e.g. for paving or repairing roadways. U.S. Pat. No. 3,285,758 and No. 3,413,385 describe methods of making or repairing refractory furnace linings or walls with such mixtures, wherein the produced structure is exposed to elevated temperature during or shortly after application of the mixture.

The magnesia-polyphosphate chemical bonding systems of the mixtures described in the aforementioned patents provide very rapid setting even at low ambient temperatures (cold weather conditions), good adherence to metal and other surfaces, and sufficient strength in the produced structures to withstand substantial impacts without loss of integrity. The bulk density of the specifically described concrete and furnace lining structures, however, is far too high (on the order of 150 lb./ft.$^3$ or above), and their thermal conductivity is correspondingly too great, for use of these mixtures as fire protection materials for structural members and the like; i.e. whereas fire protection coatings for steel beams are necessarily relatively thin, owing to considerations of space and weight, such thin coatings of the mixtures specifically described in the aforementioned patents would not afford adequate insulating effect to satisfy fire protection requirements.

SUMMARY OF THE INVENTION

The present invention broadly contemplates the provision of fire protection materials having polyphosphate-magnesia bonding systems, and embraces the discovery that such materials may be produced, with important attendant advantages, by mixing ammonium phosphates (in aqueous solution) having a polyphosphate content of at least about 20% with a lightweight refractory aggregate including the magnesia of the bonding system, and allowing the mixture to set. This use of polyphosphate-magnesia systems to bond lightweight refractory aggregates (as distinguished from the heavier aggregates used in the concrete and furnace-lining formulations described in the aforementioned patents) results in materials which are fully effective, for example, as fire protection coatings in thicknesses comparable to the thicknesses of conventional fire protection coatings for steel or other structural members. Indeed, coatings produced in accordance with the invention exhibit unexpectedly good fire protection properties, owing (as at present believed) to their high liquid content and to hydrates formed in the bond; i.e. the heat taken up in removing the contained liquid and hydrates reduces the initial rate of heat transfer through the coating.

The materials of the present invention are particularly advantageous in that they set very rapidly, when applied, without need for any externally supplied heat even under cold weather conditions, and they are strongly self-adherent to steel and other substrates. Moreover, they do not lose effectiveness as fire protection even after prolonged exposure to cold; they are sufficiently strong to withstand substantial impacts without loss of structural integrity; and they withstand exposure to fire well enough so that, with patching, they are capable of continued fire protection service thereafter. Consequently, these materials offer especially desirable attributes for use as fire protection coatings and other bodies in building construction and the like.

As employed herein, the term "lightweight refractory aggregate" refers to an aggregate, at least partially constituted of magnesia, which is resistant to fire at temperatures at least as high as about 1500° F. and which, when combined with ammonium phosphates in aqueous solution in accordance with the invention and allowed to set into a solid, continuous coating layer or body, forms a material having a bulk density of not more than about 50 lb./ft.$^3$ and preferably not more than about 40 lb./ft$^3$. Preferred aggregates for the practice of the invention are resistant to fire at temperatures at least as high as about 2000° F. Also, it is at present preferred to use a lightweight refractory aggregate consisting essentially of a mixture of particulate magnesia (typically having a bulk density in excess of the specified upper limit for the produced material) with one or more low bulk density particulate refractory substances which are inert with respect to the ammonium phosphates. The particles of these inert refractory substances may have either high or low external porosity. The magnesia content of the lightweight refractory aggregate is a proportion (preferably at least about 20% of the aggregate) effective to form with the phosphates a bond providing adequate strength for the produced material so that the material has structural integrity and cannot be crumbled by hand; very preferably in many instances, especially in aggregates wherein the particles of the inert refractory substance (with which the magnesia is mixed) have relatively high external porosity, the magnesia content of the aggregate is at least about 35%, and may range upwardly to 50% or even above, provided that the magnesia (which is ordinarily the highest bulk density component of the aggregate) does not impart excessive bulk density to the ultimately produced material. As will be understood, if a sufficiently lightweight magnesia is used, such very lightweight magnesia may constitute most or even all of the lightweight refractory aggregate employed in the practice of the invention.

It will further be understood that all proportions and percentages herein set forth are expressed by weight unless otherwise specifically stated, and that the term "polyphosphates" herein embraces pyrophosphate as well as higher (e.g. tri- and tetra-) polyphosphates.

The amount of phosphates employed in the practice of the invention is a proportion effective (in combination with the magnesia content of the aggregate) to bond the aggregate into a solid, continuous, integral coating or other body. With an aggregate wherein the inert refractory substance is externally porous, it is at present ordinarily preferred that the amount of phosphate solution used be in a range between about 90 and about 180 parts per 100 parts of aggregate, to insure that the phosphate solution will thoroughly wet the aggregate; thus, in the case of phosphate solutions having a concentration of (for example) 34.2% $P_2O_5$, these proportions of solution correspond approximately to a range of about 31 to about 62 parts of phosphate (expressed as $P_2O_5$) per 100 parts of aggregate, but the phosphate solution may be diluted to achieve equivalent thorough wetting with a lower proportion of phosphates present. Lesser proportions of phosphates and solution (e.g. down to about 20 parts of $P_2O_5$ per 100 parts of aggregate, or even less in some instances) may, however, be used especially when the inert particle content of the aggregate is a substance having little or no external porosity.

Thus, in an important specific aspect, the invention contemplates the provision of a method of fire-proofing a structural member having a surface, comprising coating the surface with a mixture of lightweight refractory aggregate including magnesia and ammonium phosphates in aqueous solution, the composition of the phosphates being at least about 20% polyphosphates, balance orthophosphate, for establishing on the surface a dried fire protection coating layer having a bulk density of not more than about 50 lb./ft.$^3$ covering and adhering to the surface, and allowing the mixture to set on the surface to constitute the dried coating layer, the proportions of magnesia and phosphates in the mixture being effective to bond the aggregate in the coating layer into a solid continuous mass. In a further important aspect, the invention contemplates the provision of a fire protection coating produced by this method. It will be understood that, more broadly, the methods of the invention and the materials thereby produced are applicable to a variety of situations including not only the provision of fire protection coatings but also the provision of insulating layers or other bodies.

Further features and advantages of the invention will be apparent from the detailed description hereinbelow set forth.

DETAILED DESCRIPTION

For purposes of illustration, the invention will be specifically described as embodied in procedures for producing a fire protection coating for steel structural members, and in the products of such procedures, as representing one particularly important and advantageous specific application of the invention.

The invention employs, as a starting material, ammonium phosphates in aqueous solution wherein the composition of the phosphates is at least about 20% polyphosphates (principally pyrophosphate in most cases, together with minor amounts of higher polyphosphates, or even essentially all pyrophosphate), balance orthophosphate. Typically, the solution contains about 8% to about 12% ammoniacal nitrogen and about 30% to about 38% $P_2O_5$; specific examples of nominal concentrations are 10% ammoniacal nitrogen, 34% $P_2O_5$, and 11% ammoniacal nitrogen, 37% $P_2O_5$. Such solutions commonly contain about 50% water, balance minor amounts of impurities as in the case of the solutions described in U.S. Pat. No. 3,879,209. That is to say, the phosphate solutions employed in the practice of the invention may be essentially identical to those described in the last-cited patent except that the polyphosphate content of the phosphates, as stated, may be at any value ranging upwardly from about 20% and may be essentially all pyrophosphate. As that patent states, in addition to the polyphosphate content, the ammonium component is also essential for attainment of the desired results of the invention.

Such ammonium phosphate solutions can be prepared by ammoniation of polyphosphoric acid, as further described in the aforementioned U.S. Pat. No. 3,879,209. Polyphosphoric acid may be represented by the formula

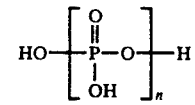

If n=1, the acid is orthophosphoric; if n=2, the acid is pyrophosphoric; if n=3, the acid is triphosphoric; if n=4, the acid is tetraphosphoric, etc. The corresponding ammonium phosphates (i.e. orthophosphate, pyrophosphate, tripolyphosphate, etc.) are represented by substitution of the ammonium radical ($NH_4+$) for the $H+$ in one or more of the hydroxy groups in the above formula, such substitution being effected by ammoniation. Procedures for ammoniation are well known in the art and accordingly need not be described in detail; one such known procedure, especially convenient for preparation of phosphates having a selected polyphosphate content within the range employed in the present invention, involves reaction of wet-process superphosphoric acid with gaseous ammonia in a so-called pipe reactor.

The product of this procedure is a mixture of ammonium phosphates in aqueous solution, typically including orthophosphate, pyrophosphate, and small amounts of higher polyphosphates, and typically having the concentration known in the fertilizer art as 10-34-0 or 11-37-0. Appropriate selection of process variables to produce, in these solutions, desired relative amounts of orthophosphate and polyphosphates (comprising or including pyrophosphate) will be readily apparent to those skilled in the art of making ammonium phosphate solutions.

A suitable ammonium phosphate solution for the operation of this invention is a commercial product known as sequestered phosphatic solution (SPS), which is used primarily as agriculture fertilizer. Such solutions contain orthophosphate, pyrophosphate and higher polyphosphates. A typical analysis shows 10.2% ammoniacal nitrogen, and 34.2% total $P_2O_5$. The $P_2O_5$ distribution is approximately 38% as orthophosphate, 48% as pyrophosphate, 10% as tripolyphosphate, 3% as tetrapolyphosphate, and 1% as higher polyphosphates.

This commercial material has approximately 4% of impurities, which do not adversely affect its use in the practice of this invention. These impurities comprise approximately 1.7% sulfuric acid, 0.6% iron, 0.5% aluminum, and 0.05% fluorine. This commercial product also contains roughly about 50% water.

As a particular feature of the present invention, an aqueous solution of ammonium phosphates as described above is mixed (in the manner hereinafter explained) with a lightweight refractory aggregate comprising or containing magnesia. The phosphate solution is preferably used full strength, but may be diluted with e.g. as much as an equal amount of water. The reactive component of the aggregate is the magnesia, and may, for example, be highly calcined or dead-burned magnesia of fine particle sizes; stated generally, any particulate magnesia capable of reacting with the phosphates to produce a bonded structure may be employed.

If the form of magnesia used is sufficiently light it may constitute the sole component of the aggregate, i.e. if an aggregate consisting entirely of such magnesia, bonded with an ammonium polyphosphate-magnesia bonding system, provides a solidified product having a bulk density of not more than about 50 lb./ft.$^3$ (preferably not more than about 40 lb./ft.$^3$). More usually, however, it is preferred to employ a magnesia having a bulk density substantially in excess of these upper limits; and in that case, in accordance with preferred embodiments of the invention, the lightweight refractory aggregate consists essentially of a mixture of the magnesia with one or more low bulk density refractory particulate substances (which are inert with respect to the ammonium phosphates) in relative proportions such that the magnesia is present in an amount effective to provide a bonded aggregate product at least strong enough to resist crumbling by hand, and the low bulk density particulate is present in an amount effective (in relation to the magnesia present) to enable attainment of the desired low bulk density of the produced fireproof coating. Aggregates having a magnesia content of at least about 20%, preferably (when inert particulate substances of high porosity are used) at least about 35% (based on total weight of aggregate), are found to provide adequate strength in the produced fire protection materials, while a presently preferred upper limit of magnesia content (in mixtures with low bulk density refractory particulates) is about 50%.

Examples of materials suitable for use as the low bulk density refractory particulate substance of the lightweight refractory aggregate include aggregates for lightweight concrete such as pumice, expanded or sintered clay, shale, slate, diatomaceous shale, perlite, vermiculite, slag, scoria, volcanic cinders, tuff, diatomite, sinter fly ash, industrial sinters, asbestos, certain lightweight fibers and other synthetic materials, amorphous expanded silicate aggregate, and foamed glass beads. Of these, two currently preferred substances are vermiculite, a foliated mineral (viz. a clay mineral with an expanding structure) consisting of an alteration product of biotite and other micas, and perlite, a form of glassy rock that explodes or expands when heated to 1500°–2000° C. Pertinent properties of these and other illustrative low bulk density particulate refractory substances suitable for use in the practice of the present invention are set forth below, together with corresponding data for the magnesia and phosphates of the bonding system:

| Substance | Particle Size (in.) | Thermal Conductivity (Btu /ft$^2$ /hr/ °F./in.) | Bulk Density lb. /ft$^3$ | PCE (5) (°F.) |
| --- | --- | --- | --- | --- |
| perlite | 1/32–⅛ | 0.34 | 7.5 | 2370° |
| vermiculite | | | | |
| coarse | ~⅛ | 0.43 | 6 | 2470° |
| fine | 1/32–⅛ | 0.42 | 7 | 2470° |
| "Dacotherm" (1) | | | | |
| coarse | ~⅛ | 0.23 | } 2.5 | — |
| fine | — | 0.24 | | |
| foamed glass beads (2) | | | | |
| coarse | 3/16–5/16 | 0.37 | } 8.7 | — |
| fine | ⅛–¼ | 0.35 | | |
| "SCR Veri-lite" (3) | 1/16–1/32 | 0.74 | 29 | — |
| dead burned magnesia ("DB 87") | (4) | — | 105 | — |
| polyphosphate "SPS" | — | — | 87 | — |

(1) trade name for an amorphous expanded silicate aggregate, viz. a spherical foam of inert silicate glass containing no free silica, produced by Diamond Shamrock Corporation
(2) produced by Pittsburgh-Corning
(3) an expanding clay aggregate commercially available from Mapleton Development, Inc.
(4) typically -100 mesh size (Tyler)
(5) pyrometric cone equivalent, a conventional way of measuring degree of refractoriness of a material Aggregate particle size is not critical, except that presence of excessive fines may (at least in some instances) lead to undesired shrinkage of the coating during setting and consequent poor adherence to the substrate surface.

Typical examples of lightweight refractory aggregate mixtures suitable for the practice of the present invention are 25% perlite, 25% vermiculite, 50% magnesia; 50% perlite, 50% magnesia; and 75% glass beads, 25% magnesia.

Most of the low bulk density particulate refractories mentioned above (e.g. perlite, vermiculite, and "Dacotherm" expanded silicate) are relatively highly porous, i.e. they have external pores. The glass beads, on the other hand, exemplify suitable low bulk density particulate refractories having little external porosity. Other low-porosity inert refractories suitable for the aggregates of the present invention are provided by sealing (e.g. with a conventional surface coating, in known manner) a highly porous aggregate material such as perlite; thus, for example, the inert portion of the aggregate may be sealed perlite. Presence or absence of porosity in this component of the aggregate is among the factors determining the optimum or preferred proportions of phosphate solution to be incorporated in a mixture with the aggregate in accordance with the invention, because sufficient phosphate solution must be present to wet the aggregate thoroughly; porous aggregates, such as those containing ordinary (unsealed) perlite and vermiculite in mixture with magnesia, require greater amounts of solution to achieve the requisite wetting than do low-porosity aggregates such as mixtures of magnesia and glass beads. At the same time, the proportion of phosphate solution used should be such as to impart a satisfactory consistency to the phosphate solution-aggregate mixture for application of the mixture to a surface to be coated. Excessive liquid, for instance, may make the mixture too thin for proper application. In addition, the phosphate must be present in the mixture in an amount effective (i.e. in conjunction with the magnesia) to bond the aggregate into a solid, continuous, integral body or coating.

For use with porous aggregates such as those containing perlite and vermiculite, a satisfactory range of phosphate solution proportions is about 90 to about 180 parts per 100 parts of aggregate; if the solution is a full-strength SPS solution, containing 34.2% $P_2O_5$, this range of proportions corresponds to between about 31 and about 62 parts of phosphates (expressed as $P_2O_5$) per 100 parts of aggregate. Particularly for low-porosity aggregates such as mixtures of magnesia with foamed glass beads or sealed perlite, as little as about 20 parts of $P_2O_5$ per 100 parts of aggregate or even lesser amounts of phosphate solution may be used, e.g. 37.5 parts of full-strength SPS solution (12.75 parts of $P_2O_5$) per 100 parts of aggregate.

Owing to the very rapid setting times of the mixtures employed in the present invention, the magnesia-containing aggregate should be kept away from contact with the phosphate solution until a time just prior to application of the mixture for setting; i.e. mixing should occur immediately before, or even during, delivery of the mixture to the locality at which it is to set. Such mixing may be performed in any of the ways described in the aforementioned U.S. Pat. No. 3,879,209, e.g. in a small mixer located at the site of application of the mixture, or in a so-called "gun" (e.g. of known design) for applying the mixture. In any event, the mixing is conducted in a manner to assure thorough wetting of the aggregate particles with the phosphate solution.

Immediately upon mixing, the phosphate-aggregate mixture is disposed for setting by application thereof as a layer on a surface (e.g. a steel beam) to be coated. The just-mixed mixture is sufficiently workable so that it may be applied in a conventional manner as by gunning. Standard "guns" are available in the industry for this purpose, and are capable of mixing water or other liquid with a dry mix just prior to shooting the resultant wet mix to the desired areas; the phosphatic solutions are used as the liquid in the gunning operation in the practice of this invention. Any surface smoothing or shaping of the mixture (after deposit thereof at the locality at which it is to set) must be performed at once, before setting occurs.

Stated further with reference to the production of fire protection coatings, the mixture is preferably applied at an ambient atmospheric temperature (i.e. at a temperature below 212° F., and very preferably below about 150° F.) and thereafter continuously maintained out of exposure to any higher temperature, for a setting period of preferably at least a number of days. The mixture thus applied sets within a few minutes after the aggregate and solution first come into contact. In this initial period, an exothermic reaction occurs, with noticeable (but not excessive or inconvenient) generation of heat and evolution of gaseous ammonia. Thereafter, the set structure (maintained in the described ambient temperature situation) progressively develops strength, while bonding strongly to metal or other surfaces with which it is in contact.

Thus, the method of the invention, as used to produce a fire protection coating for a steel or other structural member or the like, involves the steps of mixing the phosphate solution and lightweight refractory aggregate in appropriate proportions as described above; immediately after mixing, applying the mixture to the surface to be coated; and then allowing the applied mixture to set. This operationally simple procedure may be performed entirely at ambient atmospheric temperature, even in cold weather, no externally supplied heat being needed for setting or drying. Typically, for fire protection service the mixture is applied to a structural member surface as a continuous coating layer about one inch thick. Since it is desired that the coating have a bulk density of not more than about 50 lb./ft.$^3$ (preferably not more than about 40 lb./ft.$^3$), and since the bulk densities of coatings made of any given composition can vary substantially depending on the manner in which the coatings are formed, owing to the compressible nature of these materials, the application of the mixture for setting is so performed as to avoid excessive compression.

The product of this method is a solid, continuous, integral coating e.g. about one inch thick, which is satisfactorily self-adherent to the steel or other substrate surface, and is hard enough to withstand substantial impacts. It has a bulk density of not more than about 50 lb./ft$^3$, and preferably not more than about 40 lb./ft.$^3$. One-inch-thick coatings produced in accordance with the invention are found to keep the temperature of a coated steel substrate below 1000° F. for at least an hour of continuous exposure (of the coating surface) to 2000° F.; they do not lose fire protection effectiveness even after long exposure to cold, do not explode when exposed to sudden heat, and endure fire well enough to be patchable for continued fire protection service.

While specific reference has been made above to the coating of steel structural members, the invention is also applicable to the coating of other substrates and, in a broader sense, to the formation of types of bodies other than coatings. For example, the phosphate solution-aggregate mixture may be disposed for setting in an appropriately shaped mold to produce fire protection bodies for incorporation in walls.

By way of further illustration of the methods and products of the invention, reference may be made to the following specific examples, wherein (except when otherwise specified) the materials employed are those listed above.

EXAMPLE I

A series of coatings were prepared and tested to determine their fireproofing effect. Each coating composition was mixed and applied, by ramming, to a 1-foot square, ¼ inch thick steel plate, to coat one side of the plate. After setting, each coating was fired with a 10-inch diameter gas burner to maintain the exposed outer surface of the coating at 2000° F. for at least one hour (that temperature being reached after heating for about three to five minutes), while the temperature of the uncoated side of the plate was measured with Chromel-Alumel thermocouples attached thereto.

The coatings employed in this example, and their pertinent properties, including the measured temperature of the uncoated plate surface ("Plate Temperature") after the coating had been fired for one hour at 2000° F., are set forth in the following Table I, wherein the practice of the present invention is represented by coatings 1–4, coating 5 being a currently commercially available fireproof coating material included for purposes of comparison. In each of compositions 1–4, the magnesia employed was Kaiser "K-grain" magnesia (−100 mesh particle size), and the polyphosphate solution used was "SPS" solution.

TABLE I

| | Composition (in parts by weight) | | | |
|---|---|---|---|---|
| Coating | Vermiculite | Other | Magnesia | Polyphosphate Solution |
| 1 | 13.1 | perlite 13.1 | 26.2 | 47.6 |
| 2 | 12.5 | "SCR Veri-lite" 12.5 | 25.0 | 50.0 |
| 3 | 8.9 | "Dacotherm" 8.9 | 17.9 | 64.3 |
| 4 | 16.7 | perlite 8.3 | 25.0 | 50.0 |

Coating 5-100 parts by weight "Monokote" fireproofing aggregate commercially available from W. R. Grace, about 120 parts by weight water

| | | Properties | | | |
|---|---|---|---|---|---|
| | Coating Thickness | Bulk Density (lb/ft.³) | | | Plate |
| Coating | (in.) | as-cast | 220° F. dried | fired | Temp. (°F.) |
| 1 | 1¼ | 33–34 | 27 | ~31 | 495 |
| 1 | ¾ | 32 | 25 | n.d. | 1000 |
| 1 | ½ | 32 | 25 | n.d. | —[1] |
| 2 | 1¼ | 60–61 | 49 | ~43 | 580 |
| 3 | 1¼ | 48–49 | 35 | ~30 | 215 |
| 3 | ½ | 28[2] | 19[2] | n.d. | —[3] |
| 4 | 1¼ | 35–36 | 29 | ~23 | 630 |
| 5 | 1¼ | ~46 | 26[4] | ~21 | 700 |

[1] reached 1000° F. after 26.5 minutes
[2] apparent error possibly caused by rebounding of applied coating from steel surface
[3] reached 1000° F. after 31 minutes
[4] dried at 220° F. or less

EXAMPLE II

A further series of coatings were prepared and tested, using the same procedure as in Example I, to determine their fireproofing effect. Bulk densities were determined, in some instances, both for the test plate coating ("plate") and for the same composition packed into a quart can ("can"). In one instance the aggregate included foamed glass beads commercially available from Pittsburgh-Corning. Compositions, pertinent properties and results are summarized in Table II.

TABLE II

| | Composition (in parts by weight) | | | | |
|---|---|---|---|---|---|
| Coating | Vermiculite | Other | Magnesia | "SPS" Polyphosphate Solution | Water |
| 6–9 | — | "Monokote" aggregate 100 | — | — | 120 |
| 10–13, 21 | 25 | "Dacotherm" | 25 | 50 | 180 | — |
| 14 | 25 | "Dacotherm" | 25 | 50 | 90 | — |
| 15 | 37.5 | "Dacotherm" | 37.5 | 25 | 90 | — |
| 16 | 25 | "Dacotherm" | 25 | 50 | 60 | 43 |
| 17 | 37.5 | "Dacotherm" | 37.5 | 25 | — | — |
| 18 | — | "Dacotherm" | 50 | 50 | 180 | — |
| 19 | — | perlite | 50 | 50 | 90 | — |
| 20 | — | "Dacotherm" (coarse) | 25 | 50 | 180 | — |
| | | "Dacotherm" (fine) | 25 | | | |
| 22–24 | 25 | perlite | 25 | 50 | 90 | — |
| 25 | — | foamed glass beads | 75 | 25 | 37.5 | — |

| | | Properties | | | | |
|---|---|---|---|---|---|---|
| | Coating Thickness | Bulk Density (lb/ft.³) | | | | |
| | | as cast | | room dried | | 220° F. dried | fired |
| Coating | (in.) | plate | can | plate | can | can | plate |
| 6 | ¼ | | | 36 | | | 26 |
| 7 | 1 | | | 20 | | | 16 |
| 8 | 1¼ | | 44 | 29 | 38 | 23 | 15 |
| 9 | 1 | | | 19[5] | | | 17 |
| 10 | ¼ | | | 36 | | | 24 |
| 11 | 1 | | | 31 | | | 20 |
| 12 | 1¼ | 37 | | 33 | | | 22 |
| 13 | 1 | | | 26[5] | | | 21 |
| 14 | 1 | | | 32 | 36 | 26 | 23 |
| 15 | 1 | | | 19 | 23 | 16 | 17 |
| 16 | 1 | | | 32 | 47 | 30 | 26 |
| 17 | 1 | | | 19 | 31 | 17 | 16 |
| 18 | 1 | 36 | 30 | 34 | 29 | 21 | 20 |
| 19 | 1 | 30 | 26 | 29 | 25 | 20 | 22 |
| 20 | 1 | 40 | 33 | 38 | 32 | 23 | 23 |
| 21 | 1 | 44 | 37 | 42 | 36 | 27 | 26 |
| 22 | ½ | 35 | 31 | 32 | 30 | 25 | 26 |
| 23 | 1 | 28 | | 26 | | | 22 |
| 24 | 1¼ | 34 | | 31 | | | 23 |
| 25 | 1 | | | 14 | 13 | | |

| | Results | | | |
|---|---|---|---|---|
| | Estimated Average | Plate | Time to Reach 1000° F.: | |
| Coating | Temperature (°F.) | Temp. (°F.) after One Hour | hr. | min. |
| 6 | 1950 | — | | 30 |
| 7 | 2050 | 920 | 1 | 9 |
| 8 | 2100 | 780 | 1 | 23 |
| 9 | 2000–2050 | 940 | 1 | 7 |
| 10 | 1750–1800 | — | | 37 |
| 11 | 2000 | 880 | 1 | 12 |
| 12 | 2050 | 565 | 1 | 33 |
| 13 | 2000 | 1010 | | 59 |
| 14 | 2050 | 890 | 1 | 7 |
| 15 | 2050 | Est. 1125 | | 52 |
| 16 | 2050 | 890 | 1 | 9 |
| 17 | 2050 | — | | 51 |
| 18 | 2000 | 870 | 1 | 6 |
| 19 | 2050 | 850 | 1 | 15 |
| 20 | 2050 | 770 | | |
| | 15 | | | |
| 21 | 2050 | 825 | 1 | 13 |
| 22 | 2000 | — | | 35 |
| 23 | 2050 | 890 | | — |
| 24 | 2050 | 440 | 2 | 4 |
| 25 | 2000 | — | | 27 |

[5] dried at 220° F.

It will be noted that in the tests set forth in Table II, coatings 10–16 and 18–25 were polyphosphate-magnesia bonded compositions (the polyphosphate again, as in Example I, being SPS solution), while coatings 6–9 were constituted of a currently available commercial fireproofing material, and included for purposes of comparison as was coating 17 which (like the coatings 6–9) omitted polyphosphate.

The fire tests of Table II demonstrate that, for coating thicknesses of one inch or more, all the polyphosphate-magnesia bonded compositions except coatings 15 and 25 (which contained only 25% magnesia, based on total weight of magnesia plus other aggregate) and coating 13 (which was dried at 220° F. before firing rather than at room temperature, as were the others) were at least about comparable in effectiveness to the commercially available material. Dilution of the SPS solution 50% by volume with water did not appear to alter the fire protection capabilities (compare coating 16 with coating 11, noting that the weight proportions of SPS solution and water in the composition of coating 16 correspond to equal volumes of SPS solution and water), although reduction of magnesia content to 25% by weight of total aggregate (coatings 15 and 25) and elevated-temperature drying (coating 13) did seem to adversely affect fire protection capability.

EXAMPLE III

A further series of polyphosphate-magnesia bonded coatings were prepared, and the bulk density of each coating composition (packed into a quart can) was determined in ascast, room-dried, and 220° F.-dried condition. For each coating, bonding strength to bare steel and aluminum-painted steel surfaces was ascertained by filling a "Dixie" paper cup with a sample of the composition, inverting the filled cup on a bare or painted surface, compressing the material through the torn-out bottom of the cup, allowing the sample to set, thereafter removing the cup, placing a ⅛ inch ring (having the same shape as the cup) over the sample with a pull spring scale attached to the ring, and pulling the sample off the steel. The pounds of force required to pull the sample off the steel (as measured by the scale) was taken as an indication of bonding strength. All the coating compositions consisted of "Dacotherm" aggregate, −100 mesh magnesia, and a mixture (in equal parts by volume) of SPS solution and water. Composition proportions and coating properties are set forth in Table III.

TABLE III

| | Composition (in parts by weight) | | |
|---|---|---|---|
| Coating | "Dacotherm" Aggregate | Magnesia | SPS Solution-Water Mixture |
| 26 | 65 | 35 | 460 |
| 27 | 65 | 35 | 230 |
| 28 | 65 | 35 | 180* |
| 29 | 55 | 45 | 388 |
| 30 | 55 | 45 | 194 |
| 31 | 55 | 45 | 180* |

| | Properties | | | |
|---|---|---|---|---|
| | Bulk Density, lb/ft$^3$ | | Bond Strength (lbs. of force) | |
| Coating | as-cast | room dried | 220° F. dried | Al painted | bare steel |
| 26 | 40 | 39 | 18 | 26 | 26 |
| 27 | 25 | 25 | 13 | 29 | weak |
| 28 | 23 | 22 | 16 | weak | 20 |
| 29 | 42 | 41 | 19 | 28 | 27 |
| 30 | 29 | 28 | 16 | 37 | 26 |
| 31 | 28 | 27 | 19 | 25 | 28 |

*100% SPS solution (no water added)

Coating compositions 26 and 29 were sloppy but castable, while the others (27, 28, 30 and 31) exhibited a good consistency for gunning.

From the above results, it appeared that the nature of the surface (aluminum painted or bare steel) did not significantly affect bond strength, nor did variation in amount of bonding ingredients or dilution of the SPS solution with water. The "weak" results were believed probably attributable to experimental error.

Other formulations containing fine-sized "Dacotherm" aggregate exhibited poor adherence to steel plates, apparently because (as at present believed) the fine sizing resulted in shrinkage and consequent debonding.

To test material strength, additional coating compositions consisting of "Dacotherm" aggregate, vermiculite and magnesia with SPS solution were prepared and allowed to set, with varying degrees of compaction. Strength was found to increase with degree of compaction and magnesia content. Mixtures containing 30% by weight of magnesia (based on total weight of magnesia+vermiculite+"Dacotherm" aggregate) could easily be crumbled by hand, while those containing 40% by weight of magnesia appeared to have sufficient strength and could not be as easily crumbled.

EXAMPLE IV

Bulk densities (room-dried) and thermal conductivities were determined for a further series of polyphosphate-magnesia-bonded coatings as set forth in Table IV:

TABLE IV

| | Composition (in parts by weight) | | | |
|---|---|---|---|---|
| Coating | Vermiculite | Other Aggregate | Magnesia ("K-grain," -100 mesh) | SPS Solution |
| 32 | — | foamed glass beads, 75 | 25 | 37.6 |
| 33 | 35 | perlite, 35 | 30 | 90 |
| 34 | 35 | "Dacotherm" aggregate, 35 | 30 | 180 |
| 35 | 25 | perlite, 25 | 50 | 90 |
| 36 | 25 | "Dacotherm" aggregate, 25 | 50 | 180 |
| 37 | — | perlite, 70 | 30 | 90 |

| | Properties | | | |
|---|---|---|---|---|
| | Bulk Density | Thermal Conductivity room dried | | |
| Coating | (lb/ft.$^3$) | short drying time | long drying time | 220° F. dried |
| 32 | 12 | .5 (18 hrs.) | .43 (3 days) | .42 |
| 33 | 21 | .68 (18 hrs.) | .62 (3 days) | .55 |
| 34 | 30 | .71 (20 hrs.) | .66 (5 days) | .50 |
| 35 | ~33 | 1.01 (24 hrs.) | .89 (23 days) | .70 |
| 36 | ~33 | 1.78 (24 hrs.) | 1.61 (22 days) | .97 |
| 37 | ~30 | .53 (7 days) | .51 (17 days) | .47 |

In contrast, a polyphosphate-magnesia bonded concrete ("Bostik 276") having a room-dried bulk density of about 150 lb./ft.$^3$ exhibited a thermal conductivity of 13.5 after room drying for about 3 months.

EXAMPLE V

An aggregate constituted of equal parts of magnesia and "Dacotherm" expanded silicate, mixed with an SPS solution diluted 50% by volume with water, was applied by casting to a steel H-beam and allowed to dry at ambient atmospheric temperature to form a coating on the beam. Owing to the manner of application, the material was not compact, and the coating was fairly weak, adversely affecting the ability of the coating to stay in place and the fire protection capability of the coating as determined by fire testing.

A mixture of the same aggregate with full-strength SPS solution was then applied by gunning to a steel H-beam and again allowed to dry at ambient atmospheric temperature to constitute a fire protection coating thereon. During the first thirty minutes of drying, several cracks appeared in the coating to a width of ⅛-¼ inch; these cracks were enlarged and regunned with a mixture of the same aggregate and an SPS solution diluted 50% by volume with water. After drying, the coated beam was transported for fire testing, and received substantial accidental impacts during transportation; the coating withstood these impacts very well. Upon fire testing using the ASTM Test E-119 Fire Tests of Building Construction and Materials, the coating (i.e. the metal protected by the coating) remained below 1000° F. for three hours and 28 minutes, and although one major crack developed in the coating during fire testing, the crack did not seem detrimental to the protection afforded.

It is to be understood that the invention is not limited to the features and embodiments hereinabove specifically set forth, but may be carried out in other ways without departure from its spirit.

We claim:

1. A method of fireproofing a structural member or the like having a surface, comprising
   (a) establishing a mixture of
      (i) a light-weight refractory aggregate including magnesia and
      (ii) ammonium phosphates in aqueous solution, the composition of said phosphates being at least about 20% polyphosphates, balance orthophosphate, the amounts of magnesia and phosphates in said mixture being effective to bond the aggregate into a solid continuous mass;
   (b) promptly after establishing said mixture, applying said mixture to said surface for forming thereon a fire protection coating having a bulk density of not more than about 50 lb./ft.$^3$; and
   (c) allowing the mixture to set, on said surface, into a solid coating layer adhering thereto.

2. A method according to claim 1, wherein said aggregate consists essentially of a mixture of magnesia and low-bulk-density refractory particles.

3. A method according to claim 2, wherein said aggregate contains at least about 20% magnesia.

4. A method according to claim 2, wherein said aggregate is porous, and wherein said mixture contains at least about 90 parts of phosphate solution per 100 parts of aggregate.

5. A method according to claim 2, wherein said mixture has a phosphate content of at least about 20 parts of $P_2O_5$ per 100 parts of aggregate.

6. A method according to claim 2, wherein said low-bulk-density refractory particles are glass beads.

7. A method according to claim 1, wherein said coating has a bulk density of not more than about 40 lb./ft.$^3$.

8. A method according to claim 1, wherein said coating has a thickness of at least about one inch.

9. A method according to claim 8, wherein said member is a steel member, said aggregate contains at least about 35% magnesia, and the steps of applying the mixture and allowing it to set are performed at ambient atmospheric temperature.

10. A method of forming a refractory body comprising
    (a) establishing a mixture of
       (i) a light-weight refractory aggregate including magnesia and
       (ii) ammonium phosphates in aqueous solution, the composition of said phosphates being at least about 20% polyphosphates, balance orthophosphate, the amounts of magnesia and phosphates in said mixture being effective to bond the aggregate into a solid continuous mass;
    (b) promptly after establishing said mixture, disposing said mixture for setting for producing a body having a bulk density of not more than about 50 lb./ft.$^3$; and
    (c) allowing said mixture to set into a solid continuous body.

11. A structural member or the like having a fire protection coating produced by the method of claim 1.

12. A refractory body produced by the method of claim 10.

* * * * *

UNITED STATES PATENT AND TRADEMARK OFFICE
CERTIFICATE OF CORRECTION

PATENT NO. : 4,262,055
DATED : April 14, 1981
INVENTOR(S) : Robert O. Russell et al.

It is certified that error appears in the above-identified patent and that said Letters Patent are hereby corrected as shown below:

Col. 10, line 22, the numeral 23 should be moved over to the column entitled "220° F. dried can" ;

line 22, the numeral 15 should be moved over to the column entitled "fired plate" ;

line 55, after "770" insert the numeral 1 in the column headed "hr." and insert the numeral 15 in the column headed "min." ;

line 56, delete the numeral 15.

Signed and Sealed this

Twenty-third Day of November 1982

[SEAL]

Attest:

GERALD J. MOSSINGHOFF

Attesting Officer     Commissioner of Patents and Trademarks